(12) United States Patent
Guyomard et al.

(10) Patent No.: US 7,959,893 B2
(45) Date of Patent: *Jun. 14, 2011

(54) METHOD FOR PREPARING A LITHIUM AND VANADIUM OXIDE OF THE $LI_{1+x}V_3O_8$ TYPE

(75) Inventors: Dominique Guyomard, Sautron (FR); Matthieu Dubarry, Limoges (FR); Marc Deschamps, Quimper (FR); Joël Gaubicher, Nantes (FR)

(73) Assignees: Batscap, Ergue-Gaberic (FR); Centre National de la Recherche Scientifique, Paris (FR)

( * ) Notice: Subject to any disclaimer, the term of this patent is extended or adjusted under 35 U.S.C. 154(b) by 1005 days.

This patent is subject to a terminal disclaimer.

(21) Appl. No.: 10/590,432

(22) PCT Filed: Feb. 16, 2005

(86) PCT No.: PCT/FR2005/000357
§ 371 (c)(1),
(2), (4) Date: Jun. 15, 2007

(87) PCT Pub. No.: WO2005/090237
PCT Pub. Date: Sep. 29, 2005

(65) Prior Publication Data
US 2007/0287061 A1    Dec. 13, 2007

(30) Foreign Application Priority Data
Feb. 23, 2004 (FR) ...................... 04 01799

(51) Int. Cl.
*C01G 31/00*    (2006.01)

(52) U.S. Cl. .................. 423/594.8; 423/65; 423/179.5; 429/231.2

(58) Field of Classification Search .............. 423/179.5, 423/65, 594.8; 429/231.2
See application file for complete search history.

(56) References Cited

U.S. PATENT DOCUMENTS
2010/0112440 A1*  5/2010  Guyomard et al. .......... 429/217

FOREIGN PATENT DOCUMENTS
| JP | 0397608 | 11/1990 |
| JP | 06171947 | 6/1994 |
| JP | 2004010445 | 8/1994 |
| WO | 2004024631 | 3/2004 |

OTHER PUBLICATIONS

Jinggang Xie et al., "Low-Temperature Sol-Gel Synthesis of $Li_{1.2}V_3O_8$ from $V_2O_5$ Gel", Materials Letters, vol. 57, 2003, pp. 2682-2687, XP002306017.

Bruno Alonso and Jacques Livage, "Synthesis of Vanadium Oxide Gels from Peroxovanadic Acid Solustion: A $^{51}V$ NMR Study", Journal of Solid State Chemistry, vol. 148, 1999, pp. 16-19, XP002359453.

Craig J. Fontenot et al., "Vanadia Gel Synthesis via Peroxovanadate Precursors. 1. In Situ Laser Raman and $^{51}V$ NMR Characterization of the Gelation Process", J. Phys. Chem. B., vol. 104, 2000, pp. 11622-11631, XP002359454.

G. Pistoia et al., "Li/$LI_{1+x}V_3O_8$ Secondary Batteries", Journal of the Electrochemical Society, Electrochemical Society, vol. 137, No. 8, 1990, pp. 2365-2370, XP000231200.

International Search Report mailed Dec. 29, 2005.

* cited by examiner

*Primary Examiner* — Steven Bos
(74) *Attorney, Agent, or Firm* — Merchant & Gould

(57) ABSTRACT

The invention relates to a method for preparing a lithium and vanadium oxide and the thus obtained products. The method comprises preparing a precursor gel by reacting hydrogen peroxide with $\alpha$-$V_2O_5$ in an aqueous medium in the presence of a lithium precursor and exposing the gel to a heat treatment in an oxidant atmosphere at a temperature ranging from 260° C. to 580° C. A compound of a formula $Li_{1+x}V_3O_8$, (0.1<x<0.25) comprises needle-shaped grains having a bimodal distibution, wherein the length (L) of the first distribution needles ranges from 10 to 50 μm and the length (L) of the second distribution needles ranges from 1 to 10 μm.

9 Claims, 1 Drawing Sheet

METHOD FOR PREPARING A LITHIUM AND VANADIUM OXIDE OF THE $LI_{1+x}V_3O_8$ TYPE

The present invention relates to a method for preparing a lithium vanadium oxide and to the product obtained.

BACKGROUND OF THE INVENTION

The main properties desired for a material intended to be used as active cathode material in a lithium battery are a high specific energy (which is the product of the capacity multiplied by the mean potential) and a long lifetime in cycling. The material $Li_{1+x}V_3O_8$ (where $0.1 \leq x \leq 0.25$) meets these criteria and many methods of preparation are described in the prior art.

It is known in particular to prepare $Li_{1+x}V_3O_8$ from $Li_2CO_3$ and $V_2O_5$ in powder form.

Hammou, et al. [Electrochim. Acta, 13 (1988) 1719] describes a method for preparing $Li_{1+\alpha}V_3O_8$ in which the reactants react in air for 6 h at 590° C. However, this temperature is very close to the melting point and results in the powder sintering, requiring it to be milled before it can be used to prepare a composite electrode.

U.S. Pat. No. 6,136,476 describes a method in which the reactants are heated to a temperature below the melting point, preferably between 350° C. and 550°, after the reactants have been mixed using various means for the purpose of reducing the particle size and of making the particle size distribution uniform.

Chaloner-Gill, et al. [J. Electrochem. Soc., 147(10), 3575-3578, (2000)] describes a method comprising a succession of steps, namely: milling of the reactant mixture; heating in air at 585° C. for 16 h; cooling and remilling; second heating in air at 585° C. for 16 h; reaction with $Li_2S$.

U.S. Pat. No. 5,520,903 describes a method consisting in milling the reactants for the purpose of mixing them and for reducing the particle size, in compressing the mixture in order to form a compact powder, and then in heating the compressed mixture at a temperature between 580 and 585° C. In this case, the product obtained is an agglomerate of single-crystal particles bonded together, which has to be milled before it can be used as electrode material. Admittedly, the milling gives free particles, but it also results in the loss of the rod-shaped single-crystal morphology, and crushed polycrystalline particles are obtained.

FR-2 831 715 describes a method consisting in powder blending the precursors in stoichiometric proportions under conditions which give a density of less than 1.5 and particle sizes within precise ranges, in heating at a temperature between 565° C. and 585° C., which is maintained for 30 min to 10 h, and then in deagglomerating the powder obtained.

In general, the aforementioned methods for preparing $Li_{1+x}V_3O_8$ are lengthy and, because of the high-temperature temperature heat treatment, the particles are relatively coarse, this being unfavorable to their use as positive electrode material for lithium batteries.

Other methods, employing gelled precursors, have also been studied.

G. Pistoia, et al., [J. Electrochem. Soc., 137, 2365, (1990)] teaches a method of preparing a gelled precursor of $Li_{1+x}V_3O_8$ (where $0.1 \leq x \leq 0.25$) by dissolving $\alpha$-$V_2O_5$ in an aqueous LiOH solution and by heating to 50° C. in a nitrogen atmosphere. The gel forms after several tens of hours.

Jinggang Xie, et al., [Mat. Letters, 57, 2682, (2003)] teaches a method of preparing an $LiV_3O_8$ gel by adding an $LiOH.H_2O$ powder to a $V_2O_5$ gel prepared beforehand by polycondensation of vanadic acid. The acid is itself obtained by passing a sodium metavanadate ($NaVO_3$) solution through an $H^+$/$Na^+$ ion exchange column. The entire process comprises a large number of steps, which are carried out over several tens of hours, with tedious and expensive use of ion exchange resin.

The various methods of preparing lithium vanadium oxide from gelled precursors comprise many steps, some of which are tedious. Furthermore, the precursors used are often expensive and their use is tricky, especially because of their toxicity.

SUMMARY OF THE INVENTION

The object of the present invention is to provide a simple and rapid method for preparing a lithium vanadium oxide $Li_{1+\alpha}V_3O_8$ and to provide the product obtained by said method.

DETAILED DESCRIPTION OF THE PREFERRED EMBODIMENTS

Figure 1:
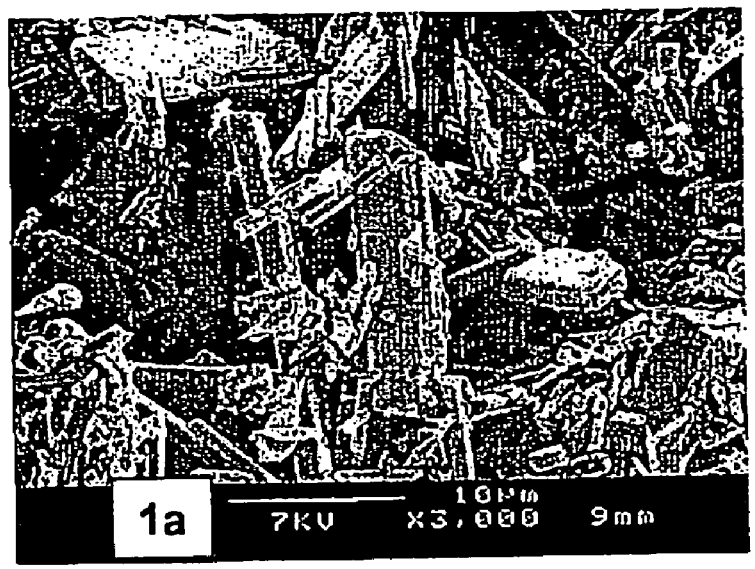
FIG. 1 shows a micrograph obtained with a JEOL JSM 6400F scanning electron microscope of specimen 1b of Example 1 after annealing.

The method according to the present invention consists in preparing a precursor gel by reacting hydrogen peroxide with $\alpha$-$V_2O_5$ in aqueous medium, in the presence of a lithium precursor, and then in subjecting said gel to a heat treatment in an oxidizing atmosphere at a temperature of between 260° C. and 580° C.

The lithium precursor may be chosen from $LiOH.H_2O$, $LiCl$, $LiNO_3$ or a lithium salt of a carboxylic acid, for example chosen from lithium acetylacetonate, lithium acetate, lithium stearate, lithium formate, lithium oxalate, lithium citrate, lithium lactate, lithium tartrate and lithium pyruvate. Among carboxylic acid salts, salts whose anion has a short chain are preferred, in order to avoid $Li_{1+x}V_3O_8$ reduction phenomena during the heat treatment.

The lithium precursor is introduced in powder form or in the form of an aqueous solution into the reaction medium. It may be introduced into the aqueous peroxide solution at the same time as the $\alpha$-$V_2O_5$. It may also be introduced into the peroxide solution after the addition of $\alpha$-$V_2O_5$, that is to say during formation of the gel, but before the end of gelling. The onset of gel formation is observed 3 minutes after the addition of $\alpha$-$V_2O_5$ to the peroxide solution. The gel is completely formed after maturing for about 30 minutes.

The lithium precursor may be a commercially available product, which can be used without preliminary milling.

The duration of the heat treatment is between about 10 minutes and about 10 hours. If the duration is less than 10 minutes, some residual water remains in the final compound. A duration of 10 hours is sufficient to obtain the maximum size of the $Li_{1+x}V_3O_8$ particles.

The respective Li precursor and $\alpha$-$V_2O_5$ quantities in the reaction medium are preferably such that:

0.16 mol/l<[Li]<0.55 mol/l;
0.22 mol/l<[$V_2O_5$]<0.75 mol/l;
1.15<[$V_2O_5$]/[Li]<1.5.

The hydrogen peroxide concentration in the reaction medium is, between 10% and 50% by volume.

When the [$V_2O_5$]/[Li] ratio lies within the aforementioned interval, a gel containing only $LiV_3O_8$ is obtained, whereas excess $V_2O_5$ or excess Li precursor gives a gel that further contains either $V_2O_5$ or $LiVO_3$. Excessively high concentration of reactants may cause effervescence, while excessively low concentrations give precipitates and not gels.

The compound obtained by the method of the invention satisfies the formula $Li_{1+x}V_3O_8$ (where $0.1 \leq x \leq 0.25$) and consists of needle-shaped particles having a bimodal distribution, the needles of a first mode having a length L of 10 to 50 μm and the needles of a second mode having a length L of 1 to 10 μm. If l is the width of the particles, L their length and t their thickness, these dimensions are such that $4 < L/l < 100$ and $4 < L/t < 100$. The method according to the invention makes it possible to obtain the compound $Li_{1+x}V_3O_8$ in pure form. X-ray diffraction analysis confirms that traces of impurities, especially $V_2O_5$, are absent.

An $Li_{1+x}V_3O_8$ compound according to the present invention may advantageously be used as active material for the positive electrode of a rechargeable battery, which constitutes another subject of the present invention.

In one particular embodiment, a positive electrode according to the present invention is formed by a composite which contains:
- an $Li_{1+x}V_3O_8$ compound obtained by the method of the present invention, as active material;
- a material conferring electronic conduction;
- a binder conferring mechanical integrity; and
- optionally, a compound conferring ionic conduction.

The content of active material of the composite of the positive electrode is preferably between 40 and 90% by weight, more particularly between 80 and 90% by weight. The content of material conferring electronic conduction is preferably between 5 and 20% by weight, more particularly between 10 and 15% by weight. The content of binder is preferably between 5 and 15% by weight. The content of compound conferring ionic conduction is preferably less than 15% by weight and may be zero.

The binder for the composite of the positive electrode may be formed by a nonsolvating polymer. The non-solvating polymer may be chosen from vinylidene fluoride homopolymers and copolymers, ethylene-propylene-diene copolymers, tetrafluoroethylene homo-polymers and copolymers, N-vinylpyrrolidone homo-polymers and copolymers, acrylonitrile homopolymers and copolymers and methacrylonitrile homopolymers and copolymers. Polyvinylidene fluoride is particularly preferred. The nonsolvating polymer may carry ionic functional groups. As examples of such polymers, mention may be made of polyperfluoroether sulfonate salts, certain of which are sold under the name Nafion®, and polystyrene sulfonate salts.

The binder for the composite of the positive electrode may furthermore be a solvating polymer. For example, it may be chosen from: polyethers of linear, comb or block structure, which may or may not form a network, based on polyethylene oxide; copolymers containing the ethylene oxide or propylene oxide or allyl glycidyl ether unit; polyphosphazenes; crosslinked networks based on polyethylene glycol crosslinked by isocyanates; oxyethylene/epichlorohydrin copolymers; and networks obtained by polycondensation and carrying groups that allow the incorporation of crosslinkable groups.

The binder for the composite of the positive electrode may furthermore be a solvating polymer/nonsolvating polymer blend.

One or more aprotic polar compounds may be added to the composite constituting the positive electrode. These compounds may be chosen from linear or cyclic carbonates, linear or cyclic ethers, linear or cyclic esters, linear or cyclic sulfones, sulfamides and nitriles.

The compound conferring electronic conduction properties on the composite constituting the positive electrode is preferably a carbon black, which does not catalyze the oxidation of the electrolyte at high potential. Many commercial carbon blacks satisfy this condition. In particular, mention may be made of the compound Ensagri Super S® sold by Chemetals.

The compound conferring ionic conduction on the composite constituting the positive electrode is preferably a lithium salt, advantageously chosen from $LiClO_4$, $LiPF_6$, $LiAsF_6$, $LiBF_4$, $LiR_FSO_3$, $LiCH_3SO_3$, lithium bis(perfluoroalkyl)sulfonimides, lithium bis(perfluoro-sulfonyl)methides and lithium tris(perfluoro-sulfonyl)methides.

A composite positive electrode according to the invention may be produced by mixing the active material and the carbon black in a solution of the binder in an appropriate solvent, by spreading the mixture obtained on a metal disk serving as collector (for example an aluminum disk) and then by evaporating the solvent. The solvent is chosen according to the binder used.

A positive electrode according to the invention may also be produced by extruding a mixture of its constituents.

An electrode thus formed may be used in a battery comprising a positive electrode and a negative electrode separated by an electrolyte comprising a lithium salt dissolved in a solvent. The operation of such a battery is effected by the reversible flow of lithium ions through the electrolyte between the electrodes. One of the subjects of the present invention is a battery in which the electrolyte comprises a lithium salt dissolved in a solvent, characterized in that it comprises a positive electrode containing the $Li_{1+x}V_3O_8$ compound prepared according to the method of the present invention as active material. During assembly of the battery, an $Li_{1+x}V_3O_8$ oxide ($0.1 \leq x \leq 0.25$) is used to form the positive electrode, the battery thus formed being in the charged state.

In a battery according to the invention, the electrolyte comprises at least one lithium salt dissolved in a solvent. As examples of salts, mention may be made of $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$ and $LiCF(R_FSO_2)_2$, where $R_F$ represents a perfluoroalkyl group having from 1 to 8 carbon atoms, or a fluorine atom.

The solvent of the electrolyte may consist of one or more aprotic polar compounds chosen from linear or cyclic carbonates, linear or cyclic ethers, linear or cyclic esters, linear or cyclic sulfones, sulfamides and nitrites. The solvent preferably consists of at least two carbonates chosen from ethylene carbonate, propylene carbonate, dimethyl carbonate, diethyl carbonate and methyl ethyl carbonate.

The solvent of the electrolyte may furthermore be a solvating polymer. As examples of solvating polymers, mention may be made of the following: polyethers of linear, comb or block structure, which may or may not form a network, based on polyethylene oxide; copolymers containing the ethylene oxide or propylene oxide or allyl glycidyl ether unit; polyphosphazenes; cross-linked networks based on polyethylene glycol cross-linked by isocyanates; oxyethylene/epichlorohydrin copolymers as described in FR-97/12952; and networks obtained by polycondensation and carrying groups that allow the incorporation of crosslinkable groups. Mention may also be made of block copolymers in which certain blocks carry functional groups that have redox properties.

The solvent of the electrolyte may furthermore be a mixture of a polar aprotic liquid compound, chosen from the aprotic polar compounds mentioned above, and a solvating polymer. It may comprise 2 to 98% liquid solvent by volume, depending on whether it is desired to have a plasticized electrolyte with a low content of polar aprotic compound, or a gelled electrolyte with a high content of polar aprotic compound. When the polymer solvent of the electrolyte carries ionic functional groups, the lithium salt is optional.

The solvent of the electrolyte may also be a mixture of an aprotic polar compound, as defined above, or a solvating polymer, as defined above, and a nonsolvating polar polymer comprising units containing at least one heteroatom chosen from sulfur, oxygen, nitrogen and fluorine. Such a nonsolvating polymer may be chosen from acrylonitrile homopolymers and copolymers, vinylidene fluoride homopolymers and copolymers, and N-vinylpyrrolidone homopolymers and copolymers. The nonsolvating polymer may furthermore be a polymer carrying ionic substituents, and especially a polyperfluoroether sulfonate salt (such as for example an aforementioned Nafion®) or a polystyrene sulfonate salt.

In another embodiment, the electrolyte of the battery of the present invention may be an inorganic conducting solid, chosen from compounds usually called "Lisicon" materials, that is to say $Li_4XO_4$—$Li_3YO_4$ solid solutions (where X=Si or Ge or Ti; Y=P or As or V), $Li_4XO_4$—$Li_2AO_4$ solid solutions (where X=Si or Ge or Ti; A=Mo or S), $Li_4XO_4$—$LiZO_2$ solid solutions (where X=Si or Ge or Ti; Z=Al or Ga or Cr), $Li_4XO_4$—$Li_2BXO_4$ solid solutions (where X=Si or Ge or Ti; B=Ca or Zn), $LiO_2$—$GeO_2$—$P_2O_5$, $LiO_2$—$SiO_2$—$P_2O_5$, $LiO_2$—$B_2O_3$—$Li_2SO_4$, $LiF$—$Li_2S$—$P_2S_5$, $Li_2O$—$GeO_2$—$V_2O_5$ or $LiO_2$—$P_2O_5$—PON solid solutions.

Of course, the electrolyte of a battery of the present invention may furthermore contain additives conventionally used in this type of material, and especially a plasticizer, a filler, other salts, etc.

The negative electrode of the battery may consist of lithium metal or a lithium alloy, which may be chosen from the following alloys: β-LiAl, γ-LiAl, Li—Pb (for example $Li_7Pb_2$), Li—Cd—Pb, Li—Sn, Li—Sn—Cd, Li—Sn, in various matrices, especially oxygen-containing matrices or metal (for example Cu, Ni, Fe, Fe—C) matrices, or Li—Al—Mn.

The negative electrode of the battery may furthermore consist of a composite comprising a binder and a material capable of inserting, reversibly, lithium ions at low redox potential (hereafter referred to as insertion material), said composite being lithiated during a preliminary step. The insertion material may be chosen from carbon-containing materials, whether natural or synthetic. These carbon-containing materials may for example be a petroleum coke, a graphite, a graphite whisker, a carbon fiber, a mesocarbon micro-bead, a pitch coke or a needle coke. The insertion material may furthermore be chosen from oxides, such as for example $Li_xMoO_2$, $Li_xWO_2$, $Li_xFe_2O_3$, $Li_4Ti_5O_{12}$ and $Li_xTiO_2$, or from sulfides, such as for example $Li_9MO_6S_6$ and $LiTiS_2$, or from oxysulfides. It is also possible to use compounds for reversibly storing lithium at low potential, such as amorphous vanadates (for example $Li_xNiVO_4$), nitrides (for example $Li_{2.6-x}CoO_{0.4}N$, $Li_{2+x}FeN_2$ and $Li_{7+x}MnN_4$), phosphides (for example $Li_{9-x}VP_4$), arsenides (for example $Li_{9-x}VAs_4$) and oxides that undergo reversible decomposition (for example CoO, CuO, $Cu_2O$). The binder is an organic binder that is electro-chemically stable in the operating range of the negative electrode. As examples, mention may be made of polyvinylidene fluoride homopolymers or an ethylene-propylene-diene copolymer. A polyvinylidene fluoride is particularly preferred. A negative composite electrode may be produced by introducing the carbon-containing compound into a solution of the binder in an aprotic polar solvent, by spreading the mixture obtained on a copper disk serving as collector, and then by evaporating the solvent, when hot, in a nitrogen atmosphere.

A battery according to the invention comprising a solid electrolyte may take the form of a succession of layers consisting, respectively, of the material of the positive electrode according to the invention and its current collector, the solid electrolyte and the negative electrode, and possibly its current collector.

A battery according to the invention comprising a liquid electrolyte may also take the form of a succession of layers consisting, respectively, of the material of the positive electrode according to the invention and its current collector, a separator imbibed with the liquid electrolyte, and the material constituting the negative electrode and possibly its current collector.

The present invention is illustrated in greater detail by the examples given below, although it is not limited thereto.

EXAMPLE 1

Preparation of $Li_{1+x}V_3O_8$ from $LiOH.H_2O$

An $Li_{1+x}V_3O_8$ compound was prepared by adding $LiOH.H_2O$ and $\alpha$-$V_2O_5$ in powder form to 25 ml of a 30% aqueous $H_2O_2$ solution in a 1 liter beaker with magnetic stirring.

Several specimens were prepared by varying, during the step of preparing the gelled precursor, the moment when the $\alpha$-$V_2O_5$ and $LiOH.H_2O$ were added, and also the concentration of the $V_2O_5$ solution $[V_2O_5]$ in mol/l. The particular conditions of the various trials are indicated in the table below.

| Specimen | $[V_2O_5]$ in mol/l | $[LiOH \cdot H_2O]$ in mol/l | Addition of $V_2O_5$ after: | Addition of Li salt after: | Gelled precursor obtained |
|---|---|---|---|---|---|
| 1a | 0.75 | 0.55 | 0 min | 0 min | $LiV_3O_8$ gel |
| 1a' | 0.75 | 0.55 | 1 min | 0 min | $LiV_3O_8$ gel |
| 1a" | 0.22 | 0.16 | 0 min | 1 min | $LiV_3O_8$ gel |
| 1b | 0.22 | 0.16 | 0 min | 3 min | $LiV_3O_8$ gel + $Li_xV_2O_5$ gel |
| 1c | 0.22 | 0.16 | 0 min | 20 min | $LiV_3O_8$ gel + $Li_xV_2O_5$ gel |

Specimen 1b corresponds to an addition of $LiOH.H_2O$ to a gel in the process of forming. Specimen 1c corresponds to an addition of $LiOH.H_2O$ to a gel already formed.

For each gel specimen obtained, the heat treatment consisted in heating in air at 580° C. for 10 hours. FIG. 1 shows a micrograph obtained with a JEOL JSM 6400F scanning electron microscope of specimen 1b after annealing. It shows that the product obtained consists of needles, the dimensions of which have a bimodal distribution.

EXAMPLE 2

The operating procedure of Example 1 was repeated, in order to prepare three specimens, but replacing $LiOH.H_2O$ with LiCl (specimen 2a), $LiNO_3$ (specimen 2b) and Li acetate (specimen 2c), respectively.

A 30 vol % aqueous peroxide solution containing 0.22 mol/l of $V_2O_5$ was used, to which the lithium salt was added after 3 minutes. In each case, an $LiV_3O_8$ gel was obtained after about 30 minutes.

A heat treatment similar to that of Example 1 was applied to each gelled precursor specimen.

EXAMPLE 3

The $LiV_3O_8$ compounds obtained after heat treatment in Examples 1 and 2 were used as active material for the positive electrode and their performance characteristics were tested in a laboratory Swagelok battery of the following type: Li/(EC+DMC+LiPF$_6$) liquid electrolyte/(Li$_{1+x}$V$_3$O$_8$+carbon+binder), operating at room temperature.

Figure 2:
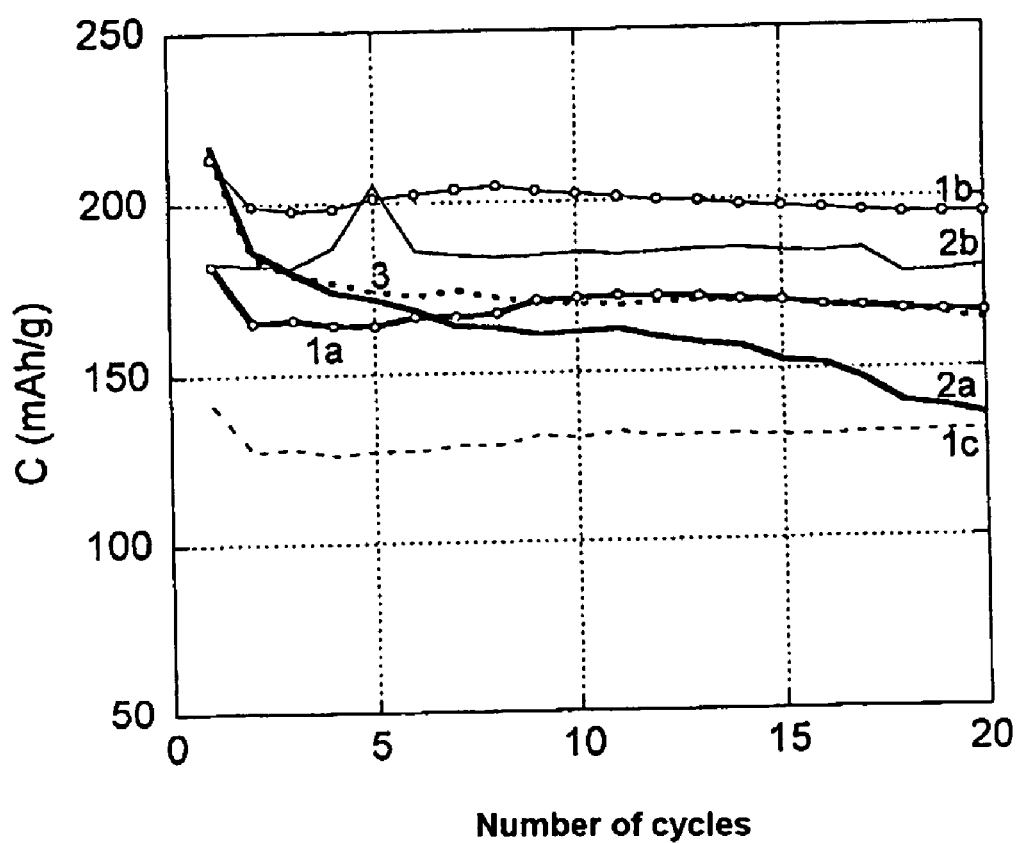
FIG. 2 shows the performance results for specimens of $Li_{1+x}V_3O_8$ compounds when used as active material for a positive electrode.

The results obtained for the various specimens are indicated in FIG. 2.

Curve 1c, corresponding to the Jinggang Xie product with late addition of lithium precursor to an already formed gel, shows the worst results—the capacity of the product remaining constant during cycling but remaining at a low level, of around 130 mAh/g.

Curve 2a corresponds to a compound obtained by the method of the invention, which is not stable in cycling.

In the case of curves 1a, 1b, 2a and 2b, which are obtained from compounds prepared according to the proposed method, it should be noted that the delivered capacities are similar and around 180 mAh/g under a discharge/charge regime of 1 Li/2.5 h and 1 Li/5 h between 3.7 V and 2 V, respectively. These results are similar to those obtained by the Pistoia technique (curve 3).

The invention claimed is:

1. A method for preparing an $Li_{1+x}V_3O_8$ compound, where $0.1<x<0.25$, comprising preparing a precursor gel by reacting hydrogen peroxide with $\alpha$-$V_2O_5$ in aqueous medium, in the presence of a lithium precursor, and subjecting said gel to a heat treatment in an oxidizing atmosphere at a temperature of between 260° C. and 580° C.

2. The method as claimed in claim 1, wherein the lithium precursor is selected from the group consisting of LiOH.H$_2$O, LiCl, LiNO$_3$ and a lithium salt of a carboxylic acid.

3. The method as claimed in claim 2, wherein the lithium carboxylic acid salt is selected from the group consisting of lithium acetylacetonate, lithium acetate, lithium stearate, lithium formate and lithium oxalate.

4. The method as claimed in claim 1, wherein the lithium precursor is introduced in powder form into the reaction medium.

5. The method as claimed in claim 1, wherein the lithium precursor is introduced into the aqueous medium at the same time as the $\alpha$-V$_2$O$_5$.

6. The method as claimed in claim 1, wherein the lithium precursor is introduced into the aqueous medium after the addition of $\alpha$-V$_2$O$_5$, before the precursor gel has finished gelling.

7. The method as claimed in claim 1, wherein the duration of the heat treatment is between 10 minutes and 10 hours.

8. The method as claimed in claim 1, wherein the respective Li precursor and $\alpha$-V$_2$O$_5$ quantities in the reaction medium are such that:
  0.16 mol/l <[Li] <0.55 mol/l;
  0.22 mol/l <[V$_2$O$_5$] <0.75 mol/l; and
  1.15 <[V$_2$O$_5$]/[Li] <1.5.

9. The method as claimed in claim 1, wherein the hydrogen peroxide concentration in the reaction medium is between 10% and 50% by volume.

* * * * *